United States Patent [19]

Hejmanowski

[11] Patent Number: 4,990,013

[45] Date of Patent: Feb. 5, 1991

[54] GLITTER CRAYON

[76] Inventor: Conrad L. Hejmanowski, 80 Banner Ave., Lancaster, N.Y. 14086

[21] Appl. No.: 399,577

[22] Filed: Aug. 28, 1989

Related U.S. Application Data

[63] Continuation-in-part of Ser. No. 261,427, Oct. 20, 1988, abandoned.

[51] Int. Cl.$^5$ ...................... B43K 19/00; C09D 11/00
[52] U.S. Cl. ......................................... 401/49; 106/19; 106/272
[58] Field of Search ...................... 401/49; 106/19, 27, 106/31, 272

[56] References Cited

U.S. PATENT DOCUMENTS

| | | | |
|---|---|---|---|
| 2,327,854 | 8/1943 | Berggren | 106/19 |
| 2,380,126 | 7/1945 | Sturm | 106/19 X |
| 4,859,242 | 8/1989 | Hughes et al. | 106/19 |

Primary Examiner—Alan W. Cannon

[57] ABSTRACT

An improved crayon composition is disclosed, comprising a base wax binder component having a melting point in excess of about 100 degrees Fahrenheit, from about 5.0 to about 50.0 weight percent of an emulsifying agent, and from about 0.01 to about 5.0 weight percent of a reflective flake.

4 Claims, No Drawings

GLITTER CRAYON

This application is a continuation-in-part of application Ser. No. 07/261,427, filed Oct. 20, 1988 now abandoned.

This invention relates to a novel crayon composition and a method for forming a glitter containing crayon marking device.

BACKGROUND OF THE INVENTION

Crayon marking devices have been used for decades for the artistic enJoyment of young and old. Typically, crayons are manufactured by mixing together a moderately high melting point wax binder with an appropriate pigmentation material, in the molten state, casting or extruding the molten mixture into the desired shape and cooling to room temperature for solidification. The resulting crayon marking device, when drawn along an appropriate surface, leaves a residue of pigmented wax on the surface.

Many improvements have been made to the crayon marking device since their inception. More and better binder materials have been developed, such that the traditional natural waxes used in crayons, such as carnauba waxes and the like, have been improved and in some instances replaced by synthetic binders that provide more uniform distribution of pigments therethrough and allow a greater diversity of surfaces on which the crayon will deposit its residue.

More and better pigmentation agents have been developed which provide a vast array of vivid colors for use in crayon compositions. The availability of a wider range of colors and hues has actually increased the demand for further improvements in the medium available through crayons, with artists young and old seeking special effects that may be attained through special crayon medium.

U.S. Pat. No. 3,057,806, introduced a fluorescent effect to crayons, wherein the a particular crayon composition was disclosed which had the ability to act as a carrier for various fluorescent pigments, particularly the dyed thermoplastic pigments.

U.S. Pat. No. 4,525,214, disclosed a crayon comprising a latent image development system, which allowed the colored development of latent, metal salt, images contained on a substrate.

U.S. Pat. No. 3,835,087, disclosed a reflex-reflecting coating composition which comprised a binder, transparent glass beads and non-metallic pigment particles. The composition was seen as having utility being applied by a brush, knife coat, spray methods and the like.

One particular effect that has been absent from the available crayon medium has been a glitter effect, which might result from the random refraction of light waves of various color from multiple randomly directioned reflective surfaces contained in a crayon residue left on a marked surface It is thus an object of the invention to provide a novel composition for use in crayons to achieve a glitter effect.

It is another object of the invention to provide crayon marking devices having randomly distributed throughout, particulate glitter effect inducing materials.

It is a still further obJect of the invention to provide a method of manufacturing a crayon marking device having a glitter effect inducing material therein.

These and other obJects will be apparent from the following description of the invention.

SUMMARY OF THE INVENTION

This invention relates to an improved crayon composition comprising a base wax binder component having a melting point in excess of about 100 degrees Fahrenheit, from about 5.0 to about 50.0 weight percent of an emulsifying agent, and from about 0.01 to about 5.0 weight percent of a reflective flake.

Crayons manufactured from the compositions of the invention, by a process wherein molten formed crayon composition is cold quenched to a temperature below about melting of the crayon composition, have been found to have a distribution of reflective flake components which provides a surprisingly consistent glitter effect when drawn on a surface.

DETAILED DISCLOSURE OF THE INVENTION

The crayon compositions of this invention can comprise a broad selection of base wax binder component which serves as a binder, strengthens the crayon, gives it body and maintains a high enough melting point of the crayon to prevent premature softening under a broad range of climate conditions. Generally any of the broad spectrum of non-toxic natural, modified-natural and synthetic waxes have utility as a binder in the crayons of the invention. Particularly preferred, for utilization in the composition of the invention, are the petroleum waxes or mixtures thereof.

The selection of an appropriate wax for use in the crayons of the invention should take into consideration whether the resulting crayon will have a sufficiently high softening point and structural strength, when in combination with the other components, to withstand the normal handling and writing pressures applied by the user at typical climatic conditions of use. Generally, the crayon must withstand use at temperatures from about 32 degrees Fahrenheit to significantly above about room temperature. Such selection should also consider that the crayon must be sufficiently soft within about that temperature range, particularly within about 15 degrees of room temperature, that through frictional engagement it will melt or otherwise leave a residue of the crayon composition when drawn along an appropriate surface.

Generally the paraffin waxes, typically comprising a mixture of straight chain or normal paraffin hydrocarbons, are adequate to meet the base wax binder component requirements of the invention, particularly those having a melting point of from about 100 to about 165 degrees Fahrenheit. Various of the animal, vegetable and insect waxes, or mixtures thereof, may also comprise the wax component of the crayon, particularly the carnauba and the candelilla waxes. Other waxes such as beeswax, ozokerite, ceresin, cocoa butter, spermaceti, hydrogenated caster oil and hydrogenated palm kernel oil, mountain wax, micro-crystalline waxes and various of the synthetic waxes such as the silicone waxes the Fischer-Tropsch waxes and the like, may comprise the base wax binder component, alone or in various mixtures.

Thus, the base wax binder component can comprise a single, relatively pure, base wax binder component or can be a mixture or admixture of a multiplicity of various natural, synthetic or petroleum waxes. Generally, the wax binder can be present in amounts from about 30 to about 90 weight percent of the crayon composition, but it is generally preferred that the composition contain from about 40 to about 80 weight percent and most preferred that the composition comprise from about 50 to about 70 weight percent wax binder.

The emulsifying agent component of the invention may generally comprise any agent which acts to wet the surface of the reflective flake component sufficiently to cause the flake component to be dispersed and suspended in the base wax binder. Typically, the preferred emulsifying agents are the non-toxic, food approved agents. Saponified carboxylic acids having from about 12 to about 20 or more carbon atoms are preferred for many utilities, particularly the higher melting point saponified carboxylic acids, that is those having a melting point higher than about 50 degrees centigrade. A particularly preferred saponified carboxylic acid is saponified stearic acid. Other emulsifying agents which can be effective include the alkylsulfonic acids and their salts, the sulfates, alkylaryl sulfonic acids and their salts, polyalkoxyethers, alkoxy esters, alkanolamides, amines and amine salts, quaternary ammonium amines and their salts, water soluble gums, lipids, fluorocarbons, silanes, silicons and various cellulose derivatives. Oleic acid and various of the Tergitol brand surfactants, particularly Tergitol 1553, have been found effective. Generally the composition can comprise from about 5.0 to about 50.0 weight percent of the emulsifying agent. Preferably the composition comprises from about 10 to about 40 weight percent emulsifying agent.

The flake component of the invention can comprise any flake material which will remain essentially non-reactive when mixed with the other components of the invention, yet will be sufficiently acted upon by the emulsifying agent to become dispersed and suspended in the base wax binder/emulsifying agent composition. The flake must have a sufficiently high melting point so that it would not be melted at about the melting point of the other components and may generally be of any size, shape or configuration, but it is typically preferred that they be flat and thin. The invention specifically contemplates the use of dimpled, crumbled and crushed flake in addition to the flat preferred flake. Generally flat flake will have an average thickness of from about 0.0001 to about 0.01 inches and can vary greatly in surface area. The preferred surface area size for a flat flake used in most utilities of the crayon is from about 0.005 to about 0.01 square inches per side.

The flake pigment can be any color and can have a mirrored, satin or the like finish. The flake material can be selected from a wide variety of materials well known in the art. The flake may be an aluminum, copper, silver, gold, brass or other like metal flake, or may be a non-metallic polymeric flake as is commonly available. Generally, the flake component can comprise from about 0.01 to about 10 weight percent of the composition. When the flake component is a polymer flake it is preferred that the flake component comprise from about 0.01 to about 5.0 weightpercent of the composition and most preferred from about 0.5 to about 1.5 weight percent. When the flake is a metal flake, it is preferred to comprise from about 1.0 to about 3.0 weight percent of the composition.

The method of manufacture of the crayon of the invention comprises what is termed the cold quench treatment. Therein, the wax binder component is typically heated to a molten state and any additives or pigments which may be desired to achieve a particular color or effect in the crayon are added thereto. The emulsifying agent may also be added to the wax binder composition at this time with or without the flake component, or it may be added as a mixture together with the flake at a time after the initial mixing of the wax binder with the other components. Generally, it is desirable to thoroughly agitate the mixture at addition of the components or immediately thereafter to assure dispersion of the components. The mixture may be held in its molten state until use in forming the crayon, or it may be allowed to solidify for later use. Generally, if the mixture is to be held for a significant time before use, or is allowed to solidify, the flake would not be added until just before use. Generally it has been found that adding the flake as a late step just prior to forming the crayon is preferred as it tends to maximize dispersion and suspension of the flake component throughout the composition.

The formation of the crayon typically comprises filling molds, or extruding the crayon into its generally recognized form. I have found that to assure that the flake is dispersed throughout the finished crayon and does not settle, that the crayon should be cold quenched to bring the crayon composition to a settlement resisting temperature as soon after its basic formation as possible. By settlement resisting temperature is meant the temperature at and below which the molten or solid composition tends to resist the settling of the flake component from the composition. Thus, if the crayon composition is liquified and poured into molds, the molds should be cold quenched to bring the crayon to a settlement resisting temperature shortly after the molds have been poured. The presence of the emulsifying agent is believed to increase the time within which cold quenching should be applied. Typically quenching should be initiated immediately after forming the crayon, but in some instances may be delayed up to 10 minutes or more without detrimental effect. Generally, I have found that reducing the temperature of the composition to a temperature above about melting of the composition is adequate to assure resistance to settlement of the dispersed flake.

The cold quench can be achieved by any convenient method. I have found that for most applications the temperature of the quenching medium need not be significantly less than the melting temperature of the crayon composition. Generally, it was found that quenching the molten crayon composition in tap water was adequate. It is however contemplated that refrigerated water might also be used as well as cooled air or other quenching gases, liquids or mixtures thereof.

The invention disclosed herein particularly recites crayons comprising a reflective flake component but, it should be understood that the compositions and method of the invention are meant to include the presence of dyes, pigments, and other additives useful in crayons, such as release agents, strengthening agents, agents which effect the crayon surface, special effect agents such as fluorescent agents and the like as are generally known in the art.

The following example is provided to exemplify a preferred mode of the invention and is not meant as a limitation thereof.

EXAMPLE I

A crayon composition is prepared comprising 40% by weight stearic acid, 49% by weight paraffin wax, 5% by weight candelilla wax and 5% by weight carnauba wax. The mixture is heated to about 5 degrees over liquification and about 1 0% by weight polyethylene terephthalate flake (Poly Flake #25038-59-9 PET), having an average thickness of about 0 008 inches is added with stirring. The molten mixture is poured into a glass crayon mold having a length of 6 inches and a diameter of ½ inch. The mold containing the molten composition is allowed to slowly cool at room temperature for about one minute and is then quenched in degree Fahrenheit tap water for about 5 minutes.

The quenched composition is allowed to stand overnight at room temperature and the next day the solidified crayon is removed from the mold Upon drawing the crayon across a paper surface, a mark is created having flake distributed therethrough. Crayons made from the process of the Example were observed to have flake distributed about their exterior surface and when they was broken, flake was noted to be distributed throughout the solid composition.

I claim:

1. An improved crayon composition comprising from about 25 to about 50 weight percent stearic acid, from about 30 to about 65 weight percent paraffin wax, from about 1 to about 20 weight percent candelilla wax, from about 1 to about 20 weight percent carnauba wax and from about 0.01 to about 5.0 weight percent of a polymer reflective flake.

2. The composition of claim 1 comprising a polyethylene terephthalate reflective flake.

3. The composition of claim 1 wherein said flake is from about 0.005 to about 0.01 square inches per side.

4. The composition of claim 1 additionally comprising at least one of a dye, pigment, fluorescent and strengthening agent.

* * * * *